(12) United States Patent
Parsons et al.

(10) Patent No.: US 8,366,150 B2
(45) Date of Patent: Feb. 5, 2013

(54) REINFORCEMENT TUBE ASSEMBLY

(75) Inventors: David Alan Parsons, Melbourne (AU); Yiqun Liu, Templestowe (AU)

(73) Assignee: Ford Global Technologies, Dearborn, MI (US)

( * ) Notice: Subject to any disclaimer, the term of this patent is extended or adjusted under 35 U.S.C. 154(b) by 523 days.

(21) Appl. No.: 12/465,340

(22) Filed: May 13, 2009

(65) Prior Publication Data
US 2010/0289281 A1 Nov. 18, 2010

(51) Int. Cl.
*B62D 21/09* (2006.01)
*B62D 21/02* (2006.01)

(52) U.S. Cl. ........ 280/797; 280/781; 280/788; 280/107; 403/365; 296/30; 296/204

(58) Field of Classification Search ........... 403/365, 403/408.1; 411/546; 280/781, 785, 787, 280/788, 797, 800, 107; 296/29, 30, 204, 296/187.09
See application file for complete search history.

(56) References Cited

U.S. PATENT DOCUMENTS

| | | | | | |
|---|---|---|---|---|---|
| 2,060,970 | A | * | 11/1936 | Belden | 16/404 |
| 2,327,585 | A | * | 8/1943 | Ulrich | 52/787.1 |
| 4,793,629 | A | * | 12/1988 | Konig et al. | 280/124.134 |
| 5,040,917 | A | * | 8/1991 | Camuffo | 403/408.1 |
| 5,876,078 | A | | 3/1999 | Miskech et al. | |
| 6,199,937 | B1 | | 3/2001 | Zetouna et al. | |
| 7,073,831 | B2 | | 7/2006 | Evans | |
| 7,334,958 | B2 | * | 2/2008 | Muller et al. | 403/168 |
| 7,393,015 | B1 | * | 7/2008 | Gillespie et al. | 280/781 |
| 7,686,387 | B2 | * | 3/2010 | Yustick et al. | 296/205 |
| 8,042,862 | B2 | * | 10/2011 | Cox | 296/204 |
| 2007/0176406 | A1 | * | 8/2007 | Ruehl | 280/785 |
| 2007/0273179 | A1 | * | 11/2007 | Hommel et al. | 296/204 |

FOREIGN PATENT DOCUMENTS

| | | |
|---|---|---|
| EP | 1854675 A1 | 11/2007 |
| KR | 3016584 A | 3/2003 |
| KR | 4026797 A | 4/2004 |

* cited by examiner

*Primary Examiner* — Ruth Ilan
(74) *Attorney, Agent, or Firm* — Gigette M. Bejin; Jason Rogers

(57) ABSTRACT

A reinforcement tube assembly for a fastener in a vehicle body structure is provided. The reinforcement tube assembly includes a reinforcement tube and a locator. The locator is affixed to the reinforcement tube. The reinforcement tube is operatively configured to receive a fastener and is operatively configured be installed at least partially within a vehicle body structure. The locator includes at least two mounting surfaces operatively configured to engage with a vehicle body structure. The locator includes at least two mounting surfaces operatively configured to engage with the vehicle body structure.

2 Claims, 4 Drawing Sheets

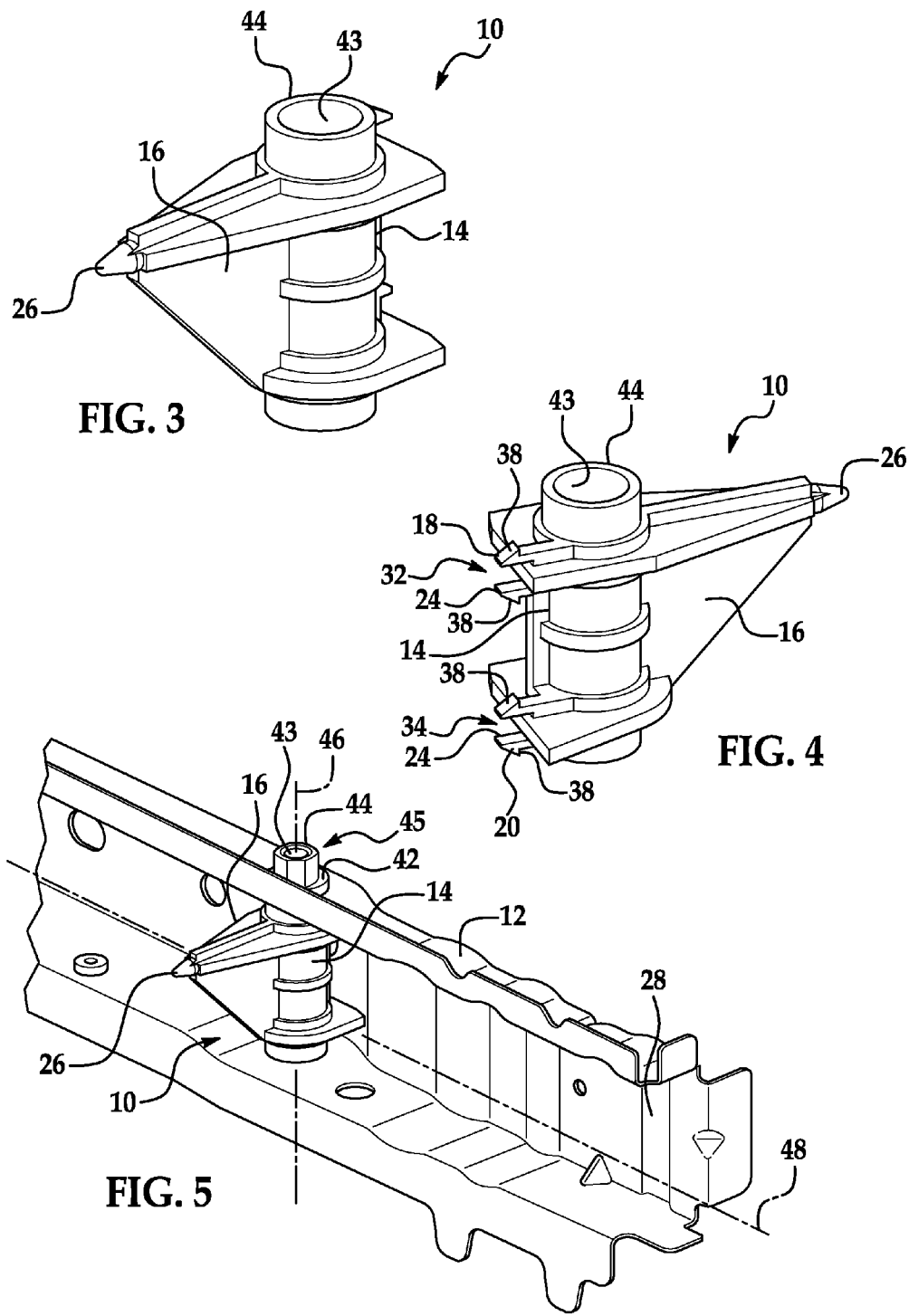

REINFORCEMENT TUBE ASSEMBLY

BACKGROUND

The present disclosure relates generally to vehicle structures, and more particularly to a reinforcement for a vehicle structure.

A chassis rail is traditionally made up of two top hat section parts welded together. The two top hat section parts may be stamped. When the reinforcement tube is installed, the reinforcement tube is fitted inside the chassis rail. The chassis rail typically implements a box section configuration. The reinforcement tube is implemented within the box section configuration (or the like) to stop the bolt from crushing the vehicle body structure or chassis rail box section (as shown in FIGS. 1 and 2) as the bolt is tightened. Reinforcement tubes are commonly used through a box section and can be seen in various industries such as automotive, aircraft, furniture and civil engineering.

In the automotive sector, a reinforcement tube is fitted into a chassis rail using a welding process. The process typically requires first, providing a first half of the rail. With reference to FIG. 1, a reinforcement tube 114 is then positioned in the first half of the rail and welded into place. Welding the reinforcement tube into the rail may be a time consuming process. The second half of the rail is then welded onto the first half of the rail thereby completely enclosing the reinforcement tube within the rail. The configuration of the reinforcement tube within the rail makes it difficult to determine if the tube is correctly located once the body structure is assembled.

Referring now to FIG. 2, the reinforcement tube of the prior art is not visible from the exterior of the rail after the rail is assembled. In the event that a reinforcement tube is missing from a chassis rail, the entire chassis rail or associated vehicle structure may need to be scrapped given the difficulty of repairing and/or inserting the reinforcement tube after the first half and the second half of the chassis rails are welded together.

SUMMARY

A reinforcement tube assembly for a vehicle body structure according to embodiment(s) disclosed herein includes a reinforcement tube and a locator. The locator is affixed to the reinforcement tube. The reinforcement tube is operatively configured to receive a mechanical fastener and is operatively configured to be installed at least partially within a vehicle body structure. The locator may include at least two mounting surfaces operatively configured to engage with the vehicle body structure.

BRIEF DESCRIPTION OF THE DRAWINGS

Features and advantages of embodiments of the present disclosure will become apparent by reference to the following detailed description and drawings, in which like reference numerals correspond to the same or similar, though perhaps not identical components. For the sake of brevity, reference numerals or features having a previously described function may or may not necessarily be described in connection with other drawings in which they appear.

FIG. 3. shows an exemplary embodiment of a front view of the reinforcement tube assembly of the present disclosure.

FIG. 4 shows an exemplary embodiment of a back view of the reinforcement tube assembly of the present disclosure.

FIG. 5 shows an exemplary embodiment of a partial perspective view of an embodiment of the reinforcement tube assembly installed on an outer member of a vehicle body structure.

DETAILED DESCRIPTION

Figure 1:
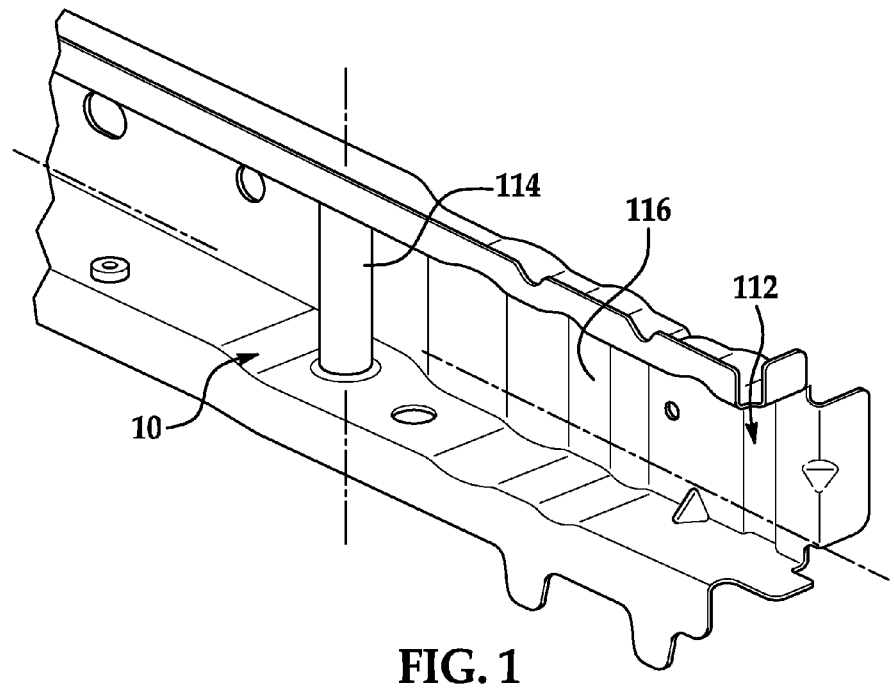
FIG. 1 shows a partial perspective view of a prior art reinforcement tube installed in one half of a chassis rail.
Figure 2:
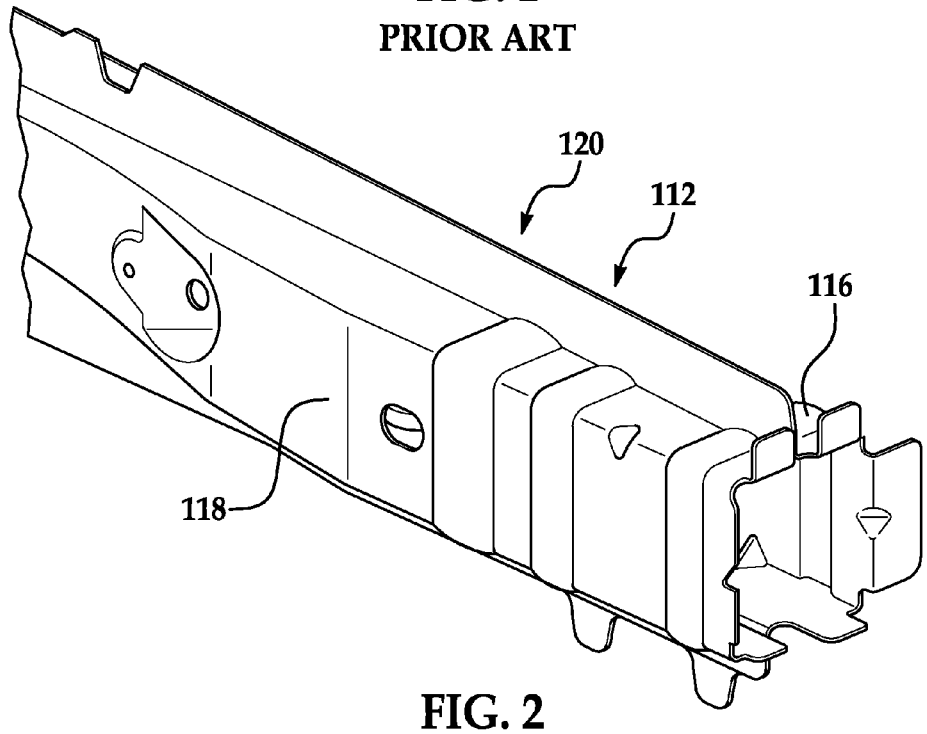
FIG. 2 shows a partial perspective view of chassis rail having the reinforcement tube of FIG. 1 disposed within the chassis rail.

Embodiments are provided herein for a reinforcement tube assembly 10 which receives a mechanical fastener 45 (such as a non-limiting example of a bolt 43 and nut 44) and prevents deformation of a vehicle body structure 12 as the mechanical fastener 45 (bolt 43 and nut 44) is tightened on the vehicle body structure 12. Unlike the prior art, the reinforcement tube assembly 10 may be installed in a vehicle body structure 12 without the use of fixturing and welding as shown in FIGS. 3-5. This improved manufacturing process reduces cost and assembly time for the body structure and the associated reinforcement tube assembly. The reinforcement tube assembly 10 of the present disclosure also provides a visual check for a user to determine if the reinforcement tube 14 has been properly positioned after the vehicle body structure 12 has been assembled.

Referring now to the drawings wherein like reference numerals are used to identify identical components in the various views, FIG. 3 illustrates a non-limiting example of a reinforcement tube assembly 10 of the present disclosure. The reinforcement tube assembly 10 for a vehicle body structure 12 includes a reinforcement tube 14; and a locator 16 affixed to the reinforcement tube 14. The reinforcement tube 14 is operatively configured to be installed at least partially within a vehicle body structure 12. The locator 16 may further include at least two mounting surfaces 18, 20 operatively configured to engage with a vehicle body structure 12. In a non-limiting example, the mounting surfaces 18, 20 may be a snap clip 24 as shown in FIG. 4 and/or a locator pin 26 as shown in FIGS. 3 and 4. It is also to be understood that the mounting surface or surfaces 18, 20 of the locator 16 may be a bracket (not shown) integral to the locator 16 which engages with a mating structure (not shown) in a vehicle body structure 12 (shown in FIGS. 6-8).

In a non-limiting example where the locator 16 includes a pin 26, the pin 26 may be integral with the locator 16 or may be affixed to the locator 16. The pin 26 may be operatively configured to engage with an aperture 40 (shown in FIGS. 6, 8, 9) in the vehicle body structure 12.

Figure 6:
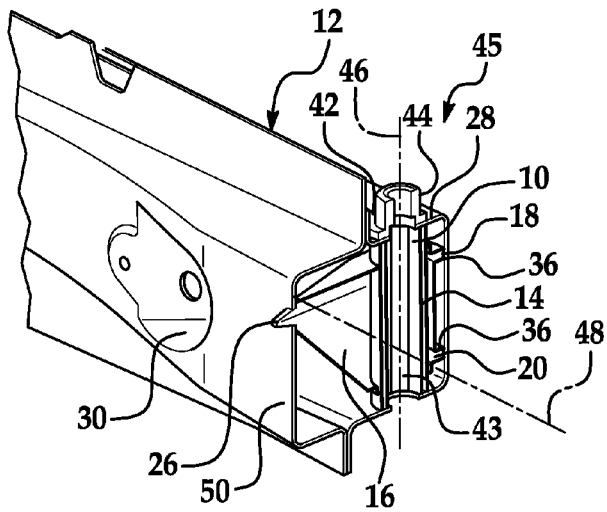
FIG. 6 shows an exemplary embodiment of a cross-sectional view of an embodiment of the reinforcement tube assembly installed on a vehicle body structure along lines C-C in FIG. 9.
Figure 7:
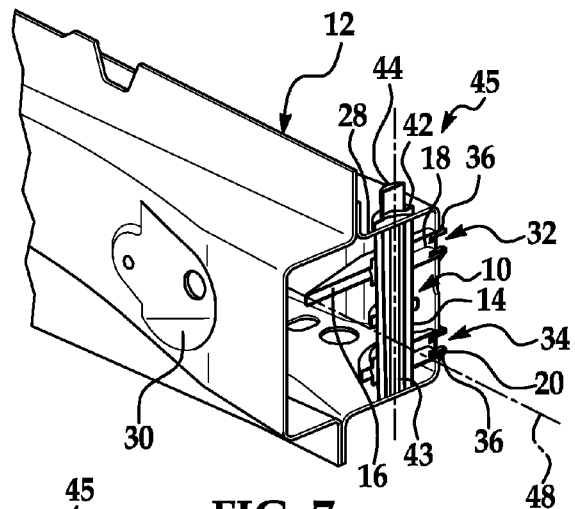
FIG. 7 shows an exemplary embodiment of a cross sectional view of the reinforcement tube assembly of the present disclosure as it is installed on the vehicle body structure along lines A-A in FIG. 9.
Figure 8:
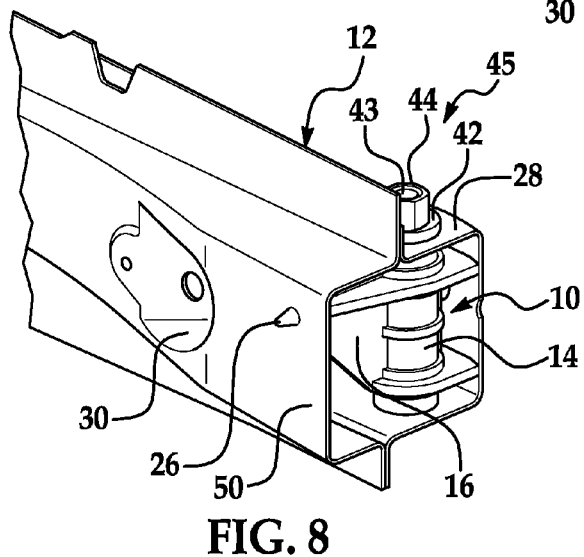
FIG. 8 shows an exemplary embodiment of a cross-sectional view of the reinforcement tube assembly of the present disclosure as it is installed on the vehicle body structure along lines B-B in FIG. 9.
Figure 9:
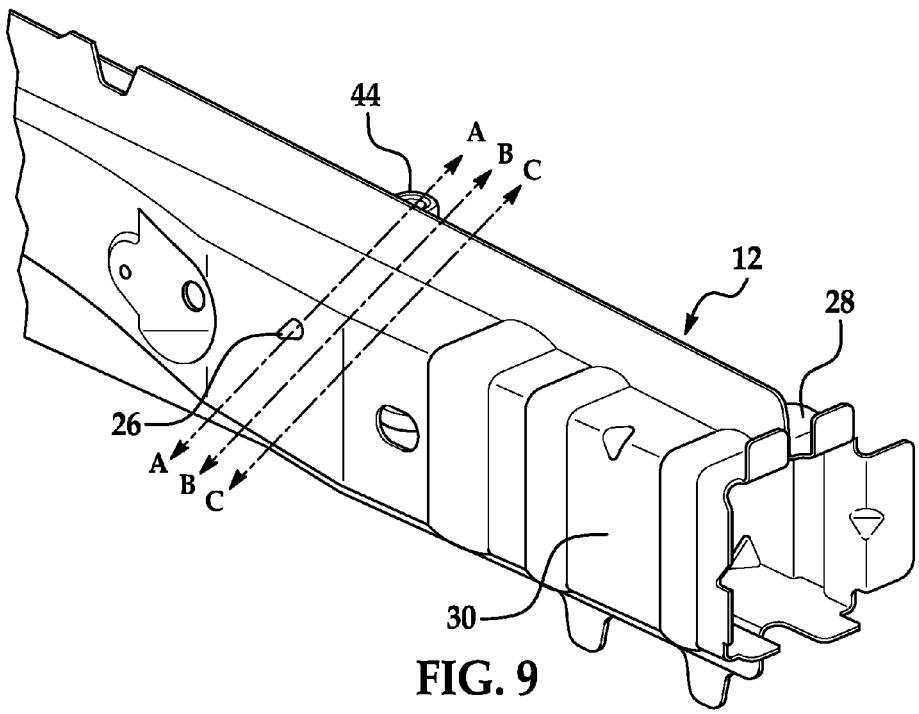
FIG. 9 shows an exemplary embodiment of a partial perspective view of an embodiment of the reinforcement tube assembly installed on the outer member and the inner member of a vehicle body structure.

As shown in the non-limiting examples shown in FIGS. 6, 8, and 9, the vehicle body structure 12 may be a chassis rail. It is also to be understood that the vehicle body structure 12 may be any portion of a vehicle body structure 12 such as an A-Pillar, B-Pillar, C-Pillar, rocker, frame, (not shown) etc.

The vehicle body structure 12 that engages with the reinforcement tube assembly 10 may include an inner member 28 and an outer member 30. Therefore, where the vehicle body structure 12 is a chassis rail 12, the chassis rail 12 may be made of an inner member 28 and an outer member 30 as shown in FIGS. 6, 8, and 9. The inner member 28 and the outer member 30 may be stamped components or may be roll formed. The reinforcement tube assembly 10 is operatively configured to prevent deformation of the vehicle body structure 12 as a mechanical fastener 45 (bolt 43 and nut 44) is tightened about the vehicle body structure 12.

In one example embodiment, the locator 16 may include a first snap fit 32 and a second snap fit 34 wherein the first snap fit 32 and the second snap fit 34 are operatively configured to engage with a corresponding aperture 36 or structure (not shown) in the vehicle body structure 12. As shown, the first and second snap fits 32, 34 may be received within aperture 36. The first and second snap fits 32, 34 may include a flexible extension 38 which engages with aperture 36 to prevent the snap fit 32, 34 from falling through the aperture 36. The flexible extension 38 is operatively configured to maintain the locator 16 and its associated reinforcement tube assembly 10 in position within the apertures 36, 40 of the vehicle body structure 12. In the non-limiting example of FIG. 7, the flexible extension 38 may engage with the vehicle body structure 12 via an aperture 36.

In the example shown in FIGS. 5 and 6, the longitudinal axis 46 of the reinforcement tube 14 may be perpendicular or substantially perpendicular to a longitudinal axis 48 of the vehicle body structure 12. The reinforcement tube 14 is operatively configured to receive mechanical fastener 45 (bolt 43 and nut 44). As mechanical fastener 45 (bolt 43 and nut 44) is tightened, the reinforcement tube 14 prevents deformation of the body structure 28 along the y-axis 46. Non limiting examples of a mechanical fastener 45 may be a screw (not shown), self pierce rivet (not shown), bolt 45 (shown in FIG. 5) and nut 44, or the like.

As shown in the example of FIGS. 6 & 8, a portion 26 of the locator 16, such as but not limited to a pin portion 26 of the locator 16 may extend beyond the outer surface of the vehicle body structure 12 when the reinforcement tube assembly 10 is installed in the vehicle body structure 12.

In certain embodiments, a portion 42 of the reinforcement tube 14 may extend beyond the outer surface of the vehicle body structure 12 when the reinforcement tube assembly 10 is installed in the vehicle body structure 12 as shown in the examples of FIGS. 5, 6, 8 and 9. In certain embodiments, it is to be understood that the locator 16 may be made of a polymer, metal, or a composite material.

Accordingly, in certain embodiments where the locator 16 is a polymeric material, the locator 16 may be molded over the reinforcement tube 14 as shown in FIGS. 5-8. In other embodiments, the locator 16 may be mechanically fastened (not shown) to the reinforcement tube 14 through the use of screws, rivets or the like (not shown).

Figure 10:
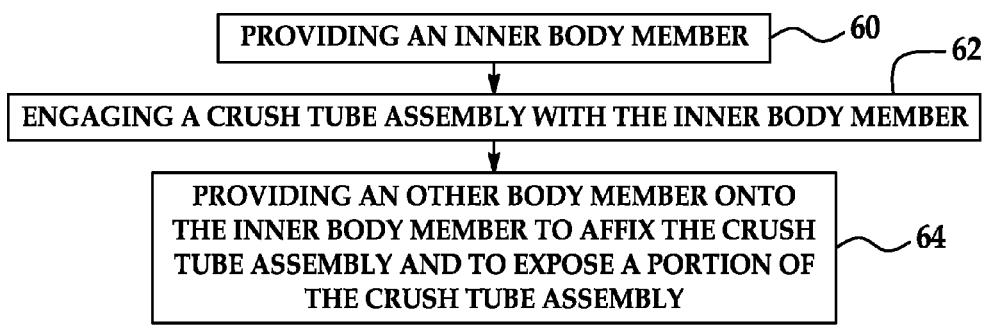
FIG. 10 shows a flow chart which illustrates an exemplary method for manufacturing an embodiment of the reinforcement tube assembly of the present disclosure.

Referring now to the example flow chart of FIG. 10, a method for manufacturing a vehicle body structure 12 with a reinforcement tube assembly 10 includes: (1) providing 60 an inner body member; (2) engaging 62 a reinforcement tube assembly with the inner body member; and (3) providing 64 an outer body member onto the inner body member and the reinforcement tube assembly so as to affix the reinforcement tube assembly between the inner body member and the outer body member thereby exposing a portion 42 of the reinforcement tube assembly 10 outside of the inner member 28 and the outer body member 30.

In certain embodiments of the method of the present disclosure, the inner member 28 may be a stamped member and/or the outer member 30 may be a stamped member. It is also to be understood that in certain embodiments of the method the reinforcement tube assembly 10 may include a reinforcement tube 14 and a locator 16 affixed to the reinforcement tube 14.

In certain embodiments of the method of the present disclosure, the inner member 28 and the outer member 30 may each define apertures 36, 40 or structures (not shown) which are operatively configured to received or engage with the locator 16 of the reinforcement tube assembly 10.

Figure 11:
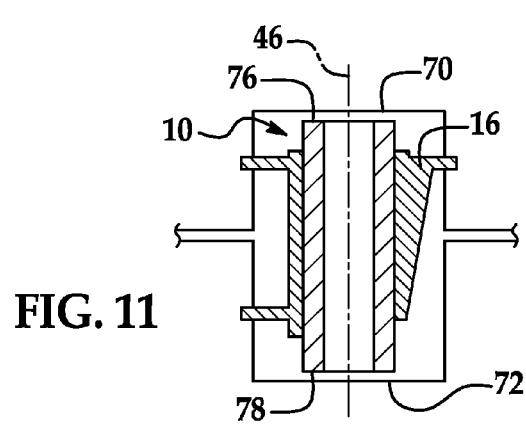
FIG. 11 shows yet another exemplary embodiment of a partial cross section wherein the vehicle body structure is made of an upper member and a lower member.

It is to be understood that terms "inner" and/or "outer" and/or the like are broadly defined herein to encompass a variety of divergent arrangements and assembly techniques. These arrangements and techniques include, but are not limited: (1) front and back; (2) upper member 70 and lower member 72 (as shown in FIG. 11); and (3) first and second. As shown in FIG. 11, the reinforcement tube assembly 10 having a locator 16 is affixed between the upper member 70 and the lower member 72 at a top end 76 and a bottom end 78 of the reinforcement tube assembly 10. It is also to be understood that the locator 16 may operate in conjunction with the arrangement of upper member 70 and lower member 72 as shown in FIG. 11 to affix the reinforcement tube assembly 10 within the body structure 12.

While multiple embodiments have been described in detail, it will be apparent to those skilled in the art that the disclosed embodiments may be modified. Therefore, the foregoing description is to be considered exemplary rather than limiting.

What is claimed is:

1. A reinforcement tube assembly for a fastener in a vehicle body structure, the reinforcement tube assembly comprising:
   a reinforcement tube operatively configured to receive a mechanical fastener and operatively configured to be installed at least partially within a vehicle body structure; and
   a locator affixed to the reinforcement tube, the locator having a mounting surface operatively configured to engage with a vehicle body structure;
   wherein the locator includes a first snap fit and a second snap fit, the first snap fit and the second snap fit being operatively configured to engage with a corresponding aperture in the vehicle body structure.

2. A reinforcement tube assembly for a fastener in a vehicle body structure, the reinforcement tube assembly comprising:
   a reinforcement tube operatively configured to receive a mechanical fastener and operatively configured to be installed at least partially within a vehicle body structure; and
   a locator affixed to the reinforcement tube, the locator having a mounting surface operatively configured to engage with a vehicle body structure;
   wherein the locator is made of a polymeric material and is molded over the reinforcement tube.

* * * * *